UNITED STATES PATENT OFFICE.

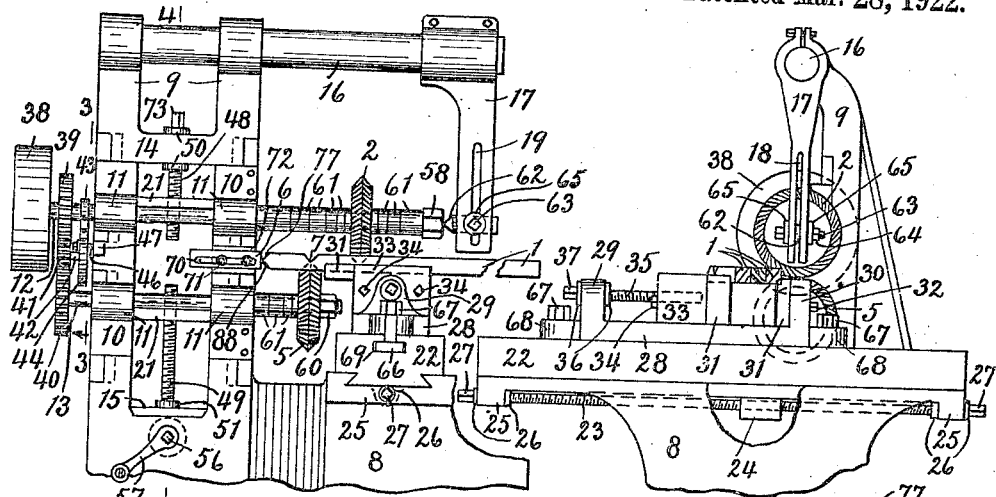

WALTER C. BROOKS, OF SPRINGFIELD, MASSACHUSETTS.

METHOD OF MANUFACTURING BITS.

1,410,990.  Specification of Letters Patent.  Patented Mar. 28, 1922.

Application filed November 17, 1920. Serial No. 424,659.

*To all whom it may concern:*

Be it known that I, WALTER C. BROOKS, a citizen of the United States of America, and a resident of Springfield, in the county of Hampden and State of Massachusetts, have invented a new and useful Method of Manufacturing Bits, of which the following is a specification.

My invention relates to improvements in the manufacture of tools technically known as bits, and resides in a new and novel method of making the same. The method consists essentially or generally in forming and cutting bits from a bar of stock, by partially cutting through and partially forming at the same time adjacent ends of two bits, from such bar, and then by completing the cutting off and forming operations, both at the same time again, whereby bits are produced which have a complete cutting part at each end, as hereinafter set forth more in detail.

By the term bit I mean a tool used in a toolholder for cutting or turning metal in lathes, shapers, planers, etc.

Heretofore short bars of steel of bit length have been produced and placed on the market. But these must be worked into proper shape at the ends to produce the bits with the cutting part required, by hand with the aid of a file. And the primary object of my invention is to produce and place on the market ready for use, and as substitutes for the aforesaid short bars of steel, complete bits, so that the purchaser is relieved entirely of the necessity of making his bits. These bits have cutting parts at both ends, as above noted.

A further object is to provide an economical and expeditious method for producing bits ready for immediate use, or, in other words, bits which are complete when they reach the hand of the purchaser. In this connection it may be observed that but little more expense is involved in producing the complete bit for the market, than is involved in providing the short lengths or bars of steel which subsequently must be worked into shape by hand.

It is understood, of course, that bits vary in size and shape, but such variation does not affect my method.

Still another object is to produce bits which are more uniform and accurate than those produced by hand in the old way.

Other objects and advantages will appear in the course of the following description.

I may attain the objects and secure the advantages of my invention by or with the aid of the mechanism illustrated in the accompanying drawings, in which—

Figure 1 is a front elevation of a machine with the aid of which I am able to carry out my method; Fig. 2, a right-hand end elevation of said machine, a portion of the frame or support being broken away to show in full certain parts which otherwise would be hidden, and the lower portion of said support being broken off in this and also in the preceding view; Fig. 3, a detail of the adjustable driving mechanism for the arbors of the machine, taken on lines 3—3, looking in the direction of the associated arrow, in Fig. 1; Fig. 4, a vertical section through a part of the machine, on lines 4—4, looking in the direction of the associated arrow, Fig. 1; Fig. 5, a top plan of the vise which holds the bar or bars of stock while the same are being cut and formed into bits by the milling cutters with which the machine is equipped; Fig. 6, a diagrammatic view illustrating the preferred method of making the bits, and that which is carried out with the aid of said machine; Fig. 7, a diagrammatic view illustrating a slightly modified method of producing the bits, and, Fig. 8, an end view of the parts represented in Fig. 7.

Similar reference numerals designate similar parts throughout the several views.

In detail, my method consists in positioning one or more bars of stock, which stock consists of tool steel, in proper position relative to a pair of milling cutters arranged on opposite sides of said bars, and in moving the latter between and across the cutting edges of said cutters and repeating the operation, so that said bars are cut from opposite sides, and in such a manner that cutting parts of the desired shape are produced at one end of each bar and at a bit length from such end, and a portion of such bar is cut from the remainder of the bar, it being necessary as one and the first step in the method to locate the bars in a predetermined position relative to said cutters, and then to relocate the bars in such position.

Preferably the milling cutters are arranged in spaced relationship laterally, but on opposite sides of the stock, and so that the distance between the planes of their major diameters is equal to the length of a bit when complete, as clearly shown in Fig. 6, wherein a bar of steel is represented at 1, upper and lower milling cutters at 2 and 5, respectively, and a stop at 6. These members are also present in the machine which will subsequently be described. The stop 6 is in line with the bar 1, and the end of said stop which receives said bar is the same distance from the major peripheral portion of the cutting part of the cutter 5 that such portion is from the corresponding portion of the cutter 2. The bar 1 when first placed in position is arranged with its leading end against the stop 6, then said bar is actuated across or through the operating or cutting field of the cutters 2 and 5 and between said cutters, with the result that the cutter 2 penetrates said bar from above and the cutter 5 penetrates said bar from below, thus in each case forming, shaping, or developing approximately one-half, or in any event one side, of the cutting parts of two bits. The bar 1 or that portion of the same that is over the cutter 5 has a transverse groove 7 therein which was cut by the cutter 2, so that said cutter 5, in cutting its transverse groove in the under side of said bar, severs the left-hand portion of the bar, now formed into a complete bit with a cutting part at each end, from the remainder of the bar. And the end of said bar, from which said bit has just been severed, constitutes the cutting part of the next bit to be made or developed, since the cutters 2 and 5 produce cutting parts at adjacent ends of each bit and the bar from which the same is cut off. The bar 1 is next moved to the left into contact with the stop 6 and again carried through the cutting and forming field, with the result that another bit is produced, and so the operation is continued until the bar 1 is used up or converted into a plurality of bits having cutting parts at both ends. In starting the bar 1 through the machine, or in the initial part of the bit-forming process, the leading end of said bar may be first brought into contact with the right-hand portion of the cutting part of the milling cutter 2, to form one side, as 77, of the cutting part of a bit at one end, and then said bar is moved to the left and the other side, as 88, of such cutting part is formed by the cutter 5, after which and at the next operation the bit thus developed at one end is developed at the other end and severed from the bar.

As previously observed, more than one bar may be operated on at the same time, the procedure being practically the same in all cases.

In the modified method (reference being had to Figs. 7 and 8) the milling cutters 2 and 5, instead of being arranged in offset relationship, are arranged in the same plane, but with the axis of one in advance or beyond the vertical plane of the axis of the other, as clearly shown in Fig. 8. This or a relatively corresponding arrangement is necessary in order to prevent the cutting parts of said cutters from coming together, which would ruin the cutters and be fatal to the success of their operation. The bar 1 is here positioned against the stop 6 as in the other example, and said bar is then carried across or through the cutting field, and between the cutters as in all cases, with the result that the cutters penetrate and shape from opposite sides adjacent ends of two bits, after the leading end of the bar is shaped. In this case the cutters complete the development and sever a bit by operating together on the same end of such bit; while in the other case the bit is not finished and severed from the bar until after said bar has been acted on by the cutter 2, and readjusted to enable the same to be acted on by the cutter 5, the final step occurring while said first-named cutter is acting to produce in the bar another initial cut or groove. In either case, however, one cutter cuts an initial groove, and the other cutter cuts through into such groove. The cutters 2 and 5 used in the modified method or the modification of the preferred method must, of course, be tangent to a plane common to both that passes between them, although such cutters must not contact with each other.

In the first example the axes of the cutters are in the same vertical plane, but in certain cases such plane might not be vertical, as will readily be understood. The present method contemplates moving the bar in a horizontal plane to produce the bits therefrom, but it is conceivable that the bar might be moved in a vertical plane instead, provided the mechanism employed in carrying out the method be constructed with that end in view.

In the modified method the leading end of the bar is or may be developed by subjecting the same to the action of the right-hand portions of the cutting parts of the cutters 2 and 5, substantially as in the first method.

It will now be seen that the two milling cutters and the stop, together with the clamping and feeding means for the bar or bars, are required in giving effect to my method of manufacturing bits. And it will be understood, furthermore, that the shape of the cutting portions of the cutters determines the shape of the cutting parts of the bits produced or formed thereby, it being practical, therefore, by using different kinds of cutters to produce the various types of bits required, or bits having cutting parts of different shapes.

Passing now to the construction of the machine, it will be observed that the same comprises, with the milling cutters 2 and 5 and the stop 6, a suitable supporting frame, supporting and revolving means for said cutters, certain adjustable means and mechanism therefor, and a reciprocable carriage provided with clamping means for the bar or bars 1, there being three of such bars shown here, together with such other elements and adjustable means as may be necessary or desirable, and I will now proceed to describe the said machine in detail.

The frame or support of the machine is represented at 8, and rising from such support at the left of the transverse center thereof are two uprights 9. Arranged to slide on the front of and between the uprights 9 are upper and under carriers 10, which carriers are provided on their front sides with bearings 11—11 for arbors 12 and 13. The milling cutters 2 and 5 are mounted on the arbors 12 and 13, respectively. The uprights 9 are connected by an upper cross-piece 14 and an under cross-piece 15. The arbors 12 and 13 are horizontal and parallel, and a supporting rod 16, parallel with said arbors, is fixed in the upper terminals of the uprights 9 and extends to the right therefrom. Depending from the free terminal of the rod 16 and secured thereto is an arm 17. The arm 17 is bifurcated to form a slot 18 which opens through the right and left-hand edges and the bottom of said arm, and there is a vertical slot 19 in each side (front and back) of the bifurcated part of said arm.

The cross-pieces 14 and 15 are respectively above and below the horizontal planes of the carriers 10, and each of said carriers has an integral projection or nut 21 which extends into the space between the uprights 9 and said cross-pieces.

A sliding carriage 22 is arranged on the top of the support 8, at the right of the uprights 9, and at right-angles to the arbors 12 and 13. The carriage 22 is mounted on the support 8 in the customary manner, and actuated by means of a screw 23, such as is usually provided for reciprocating a carriage of this character. The screw 23 is in threaded engagement with a projection or nut 24 on the under side of the carriage 22, and extends through a fixed lug 25 at each end of the support 8. Collars 26 are secured to the screw 23 at each side of each lug 25 to hold said screw against endwise movement. At each end of the screw 23 is an angular projection or head 27 to receive a crank (not shown) by means of which the screw is rotated.

Securely bolted or otherwise fastened to the carriage 22, on top of the same, is a clamp bed 28 which has rising from opposite ends thereof a lug 29 and a flange or abutment 30, the former being at the front end and the latter at the rear end of said bed. A jaw 31 is secured to the inner or front face of the abutment 30 by means of a pair of bolts 32, and a similar jaw is secured to the back side of a reciprocable block 33 by means of a pair of bolts 34. The block 33 is actuated forward and back on the bed 28 by means of a screw 35 which passes through the lug 29 and is tapped into said block. Collars 36 on the screw 35, each side of the lug 29, prevent said screw from reciprocating when rotated, so that the block 33 is actuated in one direction or the other when said bolt is rotated, according to the direction of such rotation. The bars 1 are received on the bed 28 between the jaws 31, while said jaws are separated sufficiently for the introduction between them of said bars, and then the forward jaw is closed on said bars and forces them tightly against the rear jaw through the medium of the block 33 and the screw 35, the latter being rotated in the proper direction to actuate said block rearwardly. When the screw 35 is rotated in the other direction, the block 33 with its attached jaw 31 is drawn forward or retracted to release the bars 1. The screw 35 has an angular projection or head 37 at the front end to receive a wrench or crank (not shown), by means of which said screw is operated. The bars 1 extend transversely of the bed 28 and therefore are approximately parallel with the arbors 12 and 13. Upon unscrewing the bolts 32 and 34 the jaws 31 can be removed, when other jaws may be substituted for the original ones.

The adjacent, gripping faces or edges of the jaws 31 may be at right-angles to the longitudinal center of the bed 28, and will be so constructed if the bits are to be cut without providing the cutting parts thereof with clearance, but usually such clearance is required, and, in that event, the aforesaid gripping edges are oblique to said longitudinal center, substantially as shown in Fig. 5. This construction results in producing the slight taper required at the ends of the bits for clearance.

The arbors 12 and 13 extend to the left beyond the left-hand bearings 11, and are driven through the medium of a pulley 38 and a gear 39 secured to said arbor 12, a gear 40 secured to said arbor 13, and an intermediate gear 41. The arbors are thus driven in the same direction, and they are driven at the same rate of speed because the gears 39 and 40 are alike. The intermediate gear 41 is loosely mounted on a stud 42 which projects to the left from a bracket 43, the latter being supported from the arbor 12 and loose thereon. The bracket 43 has a forwardly- and upwardly-extending, arcuate arm 44 which has a slot 45 therein adjacent to the free terminal thereof. A bolt 46 passes through the slot 45 in the bracket arm 44, and is tapped into a lug 47 on the front face of the adjacent upright 9. Upon loosening the bolt 46, the bracket 43 can be oscillated on the arbor 12 and thus adjusted to enable the intermediate gear 41 to intermesh with the gears 39 and 40, regardless of the amount of space there may be between said last-named gears, within the possible range of adjustment afforded by this driving mechanism. Convenient means is thus provided for adjusting the driving mechanism to correspond with or meet the requirements of any adjustment which may be given the arbors 12 and 13 relatively.

The arbors 12 and 13 are adjusted vertically, to accommodate milling cutters of different diameters, by moving the carriers 10 towards or away from each other. This movement of the carriers 10 is effected through the medium of an adjusting screw 48 for the upper carrier and an adjusting screw 49 for the lower carrier. The screw 48 passes down through the cross-piece 14 into threaded engagement with the upper nut 21, and is provided with collars 50 above and below said cross-piece to prevent said screw from reciprocating. At the upper end of the screw 48 is an angular projection or head 73 for a crank, as 57, with which said screw is rotated. Upon rotating the screw 48 in one direction the upper carrier 10 with the arbor 12 is elevated, and upon rotating said screw in the opposite direction said carrier is depressed or caused to descend. The screw 49 passes upwardly through the cross-piece 15 into threaded engagement with the lower nut 21, and there is a fixed collar 51 on said screw above said cross-piece and a bevel-gear 52 secured to said screw below said cross-piece. A short, horizontal spindle 55 is journaled in the front side of the support 8, and has secured to the inner end thereof a bevel-gear 54 which intermeshes with the bevel-gear 52. The spindle 53 is held against longitudinal movement by the bevel-gear 54 behind and a fixed collar 55 in front of the bearing for said spindle. The spindle 53 at the front end terminates in an angular projection or head 56 to receive the crank 57 for the purpose of rotating said spindle and with it the screw 49, through the medium of the intermeshing bevel-gears 54 and 52. When the screw 49 is thus actuated in one direction the carrier 10 for the arbor 13 is elevated, and when said screw is actuated in the opposite direction said carrier is lowered.

Adjusting means for the carriers 10, and for the driving mechanism of the arbors 12 and 13 supported from said carriers, are needed in order to permit milling cutters of different diameters to be mounted on said arbors.

The arbors 12 and 13 extend to the right beyond the right-hand bearings 11, and said first-named arbor is longer than said second-named arbor, and extends over the carriage 22 or the clamping device thereon, so as to enable the cutter 2 to be located above the horizontal plane of said device; while the arbor 13 extends only to the vicinity of said carriage, and the cutter 5 carried by said arbor is at the left of the clamping device. The abutment 30, jaws 31, and block 33 of the clamping device, while of sufficient height to engage sufficiently to bind in place the bars 1, do not extend into the path of the cutter 2. The jaws 31 extend to the left beyond the corresponding sides of the other members of the clamping device, and the projecting parts of said jaws pass over the adjacent end of the arbor 13, when the carriage 22 is reciprocated. The arbors 12 and 13 are screw-threaded at their right-hand terminals to receive nuts 58 and 60, respectively. The cutter 2 is rotatably secured to the arbor 12 in the customary manner, and located at the required point on said arbor by means of a plurality of sleeves or washers of different lengths or widths, all in the usual and well-known manner. The cutter 5 is also secured to the arbor 13 and properly located thereon in a similar manner and by similar means. The aforesaid washers are indicated by the numeral 61.

Owing to the length of the unsupported portion of the arbor 12, that is to say, the projecting portion at the right of and which is unsupported by the bearings 11 therefor, a support for such portion is needed, and the same is provided in the form of a center 62 carried by the arm 17. The center 62 is received in the slot 18 in the arm 17, and adapted to be raised and lowered in said slot to accommodate said center to the different elevations which may be given the arbor 12. The cylindrical, pointed head at the left-hand end of the center 62 is adapted to engage the contiguous end of the arbor 12 in the axial center thereof, and so assist in supporting said arbor, while at the same time centering the same at its right-hand end. A bolt 63, a nut 64, and two washers 65 are employed to hold the center 62 in place in the arm 17 and secure the same in the slot 18 after said center has been adjusted. The washers 65 are on the front and back sides of the arm 17, and the bolt 63 passes through said washers, the bifurcation of said arm, and the center 62. When the nut 64 is tightened, the divided parts of the arm 17 are forced tightly against that part of the center 62 which is in the slot 18, and so securely hold said center in place. The slots 19, in the divided parts of the arm 17, enable the bolt 63 to be moved up and down with the center 62, when the latter is adjusted to accommodate itself to the arbor 12.

Provision may be made, if desired, for the adjustment of the clamping bed 28 on the carriage 22 lengthwise thereof, and such provision may consist of a bolt 66 and a nut 67 at each end of said bed, the latter having at each end a slotted ear 68 through which the shank of said bolt passes, and said bed having therein a longitudinally-extending T-slot 69 for the reception of the head and a part of the shank of said bolt, and in which said bolt may be adjusted lengthwise of said carriage. It is apparent, therefore, that, if the nuts 67 be loosened, the bed 28, with its integral and supported parts and members, can be moved either forwardly or rearwardly on the carriage 22, after which said nuts are retightened.

The stop 6 has a longitudinal slot 70 therein, and said stop is secured in a horizontal position to the front end of an arm 72 that projects forwardly from the front face of the right-hand upright 9, by means of two bolts 71. The right-hand end of the stop 6 is in position to be contacted with by the left-hand end or ends of one or more of the bars 1, when the latter are adjusted in the clamping device. The arm 72 is located between the bearings 11 which are in front of the right-hand upright 9. It is necessary that the end of the stop 6, which is contacted with by one or more of the bars 1, be of sufficient area to enable all of said bars to contact therewith at the same time, inasmuch as the bars are clamped together so that the position of all, when they are moved to the left, may be fixed or determined by the position of any one. Upon loosening the bolts 71 the stop 6 can be moved either to the right or left for the purpose of adjustment, after which said bolts are retightened. The position of the stop 6 is a determining factor in the lengths of the bits cut by the machine, as hereinbefore explained.

The operation of the machine as a whole is described as follows:

Assuming that all parts of the machine are in condition for operation, and that any required adjustments have been made, one or more bars 1 are introduced between the clamping jaws 31 and there secured by forcing the clamping block 33 and its attached jaw toward and against the contiguous bar, through the medium of the screw 35. The bars 1 are clamped in position while the carriage 22 is at the forward end of its travel, so that said bars are in front of the cutters 2 and 5. After the bars 1 have been inserted in the clamping device, but before they are secured therein, however, said bars are thrust to the left until one or more come into contact with the adjacent end of the stop 6. It is then that the bars are locked in place. Next the carriage 22 is actuated, through the medium of the screw 23, rearwardly, and the bars 1 are carried by said carriage between and beyond or behind the cutters 2 and 5, and during such movement of said bars the cutter 5 cuts transverse bottom grooves in the bars, and cuts the latter through to the transverse top grooves (7) which have previously been cut, so that the left-hand terminal portions of the bars are converted into bits and severed from the remaining portions of said bars. The carriage 22 is then returned to its forward position, the clamping device is loosened, and the bars 1 are moved to the left as far as permitted by the stop 6, when said clamping device is retightened. The carriage 22 is again actuated rearwardly and another set of three bits is completed and cut off from the bars 1. These operations are repeated until the bars are all converted into bits, or have had formed therefrom as many bits as the length of the bars permit.

It will be understood that the bars 1 are first cut on their upper sides as near their leading ends as possible, with the cutter 2, to form one side of the cutting part at the left-hand end of each of the three bits first to be produced, and then cut on their under sides directly under the first cuts, by the cutter 5, to form the other side of said cutting part of each of said bits. The extreme leading-end portions of the bars are thus cut off and become waste. After the waste ends are cut from the bars, and the left-hand cutting parts of the leading bits are formed, said bars are moved into contact with the stop 6, when what may be termed the regular operation of the machine is proceeded with. During these cutting operations, the bars are twice clamped in position, with the aid of the stop 6, and they are first acted on by the cutter 2 and then by the cutter 5. Said bars, after being set for the proper operation thereon of the cutter 2 and cut thereby, are moved to the left and set for the proper operation thereon of the cutter 5.

In Fig. 5 are illustrated the first three cuts made by the cutter 2, the initial cut at the leading ends of the bars being represented at 77, the next cut at 7, and the third cut also at 7. In reality, of course, at the time the second cut 7 is made the cutter 5 has penetrated the undersides of the bars beneath the first cut 7 and severed the three bits at the leading end of said bars. Each cut just mentioned really comprises a cut in each of the three bars. The clearance produced by setting the bars 1 obliquely in the clamping device is clearly apparent in this view.

In Figs. 1 and 2 the bars 1 are disposed in front or forward of the cutters 2 and 5, in readiness to be carried rearwardly and acted on from above and below by said cutters.

This machine is merely an embodiment of one among various means which I might employ in carrying out my method.

What I claim as my invention, and desire to secure by Letters Patent, is—

1. A method of manufacturing bits consisting in cutting into one side of a bar of stock to form one side of the cutting part of a bit at one end, and in subsequently cutting into the other side of said bar to form the other side of such cutting part, and sever the bit thus formed from said bar.

2. A method of manufacturing bits consisting in locating a bar of stock in a predetermined position relative to rotary cutters arranged to penetrate said bar from opposite directions, holding said bar against rotation, and moving said bar through the cutting field.

3. A method of manufacturing bits consisting in locating a bar of stock in sequentially a predetermined position relative to rotary cutters arranged to penetrate said bar from opposite directions, and moving said bar through the cutting field.

4. A method of manufacturing bits consisting in sequentially locating a bar of stock in predetermined position relative to rotary cutters arranged to penetrate said bar from opposite directions and at remote points, and moving said bar through the cutting field.

5. A method of manufacturing bits consisting in clamping a bar of stock in operative position relative to rotary cutters which are in offset relation to each other and adapted to act on opposite sides of said bar to form and cut through the same, and in moving said bar through the cutting field.

6. A method of manufacturing bits consisting in clamping a bar of stock in operative position relative to offset rotary cutters arranged to act on opposite sides of said bar to form and cut through the same, and to hold it against rotation, in moving said bar through the cutting field, in loosening said bar and moving it a predetermined distance lengthwise and again clamping and holding the same against rotation, and in once more moving said bar through said cutting field.

7. A method of manufacturing bits consisting in cutting into a bar of stock from opposite sides with rotary cutters adapted to form the cutting parts of two ends of two bits, and to sever such bits, without said cutters coming into contact with each other.

8. A method of manufacturing bits consisting in cutting sequentially into a bar of stock at remote points from opposite sides with rotary cutters adapted to form the cutting parts of the bits, and to sever such bits with the second cutter in the direction of travel of said bar.

WALTER C. BROOKS.

Witnesses:
 A. C. FAIRBANKS,
 F. A. CUTTER.